(12) United States Patent
Sawyer et al.

(10) Patent No.: US 10,222,924 B2
(45) Date of Patent: Mar. 5, 2019

(54) INTERACTIVE CORD WITH RESISTANCE TOUCHPOINTS

(71) Applicant: Google LLC, Mountain View, CA (US)

(72) Inventors: Karissa A. Sawyer, Santa Clara, CA (US); Seungyon Lee, Sunnyvale, CA (US); Seth Raphael, Redwood City, CA (US); Thad Eugene Starner, Atlanta, GA (US); Jonathan Moeller, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/914,766

(22) Filed: Mar. 7, 2018

(65) Prior Publication Data

US 2019/0004635 A1   Jan. 3, 2019

Related U.S. Application Data

(63) Continuation of application No. 15/361,338, filed on Nov. 25, 2016, now abandoned.

(51) Int. Cl.
| | |
|---|---|
| *H04R 1/10* | (2006.01) |
| *G06F 3/045* | (2006.01) |
| *G06F 3/16* | (2006.01) |
| *G06F 3/041* | (2006.01) |

(52) U.S. Cl.
CPC ............ *G06F 3/045* (2013.01); *G06F 3/0416* (2013.01); *G06F 3/165* (2013.01); *H04R 1/1041* (2013.01); *G06F 2203/04102* (2013.01)

(58) Field of Classification Search
CPC ........ G06F 3/045; G06F 3/0416; G06F 3/165; H04R 1/1041
See application file for complete search history.

(56) References Cited

U.S. PATENT DOCUMENTS

| | | |
|---|---|---|
| 6,989,679 B2 | 1/2006 | Lider et al. |
| 7,388,166 B2 | 6/2008 | Marmaropoulos |
| 8,094,673 B2 | 1/2012 | Proctor et al. |
| 9,807,852 B1 | 10/2017 | Starner et al. |

(Continued)

OTHER PUBLICATIONS

"First Action Interview OA", U.S. Appl. No. 15/202,477, dated Jan. 11, 2018, 3 pages.

(Continued)

*Primary Examiner* — Simon King
(74) *Attorney, Agent, or Firm* — Colby Nipper (57) ABSTRACT

This document describes techniques and devices for an interactive cord with resistance touchpoints. An interactive cord includes an audio wire, and a fabric cover that covers the audio wire. The fabric cover includes at least one conductive thread integrated into the fabric cover to form at least one touchpoint at which the conductive thread makes contact with the audio wire when the touchpoint is pressed. The contact of the conductive thread with the audio wire creates a resistance value that is mapped to a control. The resistance value is based on a resistance of the conductive thread and a length of the conductive thread from a base of the interactive cord to the touchpoint. The resistance value is detectable by a controller implemented at a computing device that is coupled to the interactive cord. In response to detection of the resistance value, the controller triggers the control.

20 Claims, 6 Drawing Sheets

(56) References Cited

U.S. PATENT DOCUMENTS

| | | | |
|---|---|---|---|
| 2006/0258247 A1* | 11/2006 | Tao | D03D 1/0088 442/301 |
| 2007/0237170 A1 | 10/2007 | Proctor et al. | |
| 2007/0274530 A1* | 11/2007 | Buil | H04R 1/1041 381/74 |
| 2008/0158145 A1 | 7/2008 | Westerman | |
| 2009/0212909 A1 | 8/2009 | Burger et al. | |
| 2009/0257604 A1* | 10/2009 | Yeates | H01H 9/0228 381/105 |
| 2010/0116229 A1 | 5/2010 | Kojima | |
| 2010/0315299 A1 | 12/2010 | Bibl et al. | |
| 2011/0285554 A1 | 11/2011 | Aghaei et al. | |
| 2011/0316611 A1 | 12/2011 | Gustavsson | |
| 2012/0184367 A1 | 7/2012 | Parrott et al. | |
| 2012/0268406 A1 | 10/2012 | Trachte | |
| 2013/0102361 A1 | 4/2013 | Colley et al. | |
| 2013/0120052 A1 | 5/2013 | Siska | |
| 2013/0326604 A1 | 12/2013 | Hird et al. | |
| 2014/0238151 A1* | 8/2014 | Dunne | D05B 97/12 73/862.474 |
| 2014/0294192 A1 | 10/2014 | Haynes | |
| 2015/0212605 A1 | 7/2015 | Lien | |
| 2015/0334485 A1 | 11/2015 | Tyagi et al. | |
| 2016/0100244 A1 | 4/2016 | Gentile et al. | |
| 2016/0284436 A1 | 9/2016 | Fukuhara et al. | |
| 2017/0048619 A1* | 2/2017 | Bang | H04R 3/04 |
| 2017/0060298 A1* | 3/2017 | Hwang | A61B 5/6807 |
| 2018/0049296 A1 | 2/2018 | Starner et al. | |

OTHER PUBLICATIONS

"First Action Interview Office Action", U.S. Appl. No. 15/418,470, dated Feb. 8, 2018, 4 pages.

"First Action Interview Office Action", U.S. Appl. No. 15/418,432, dated May 16, 2018, 5 pages.

"Non-Final Office Action", U.S. Appl. No. 15/202,465, dated Feb. 27, 2017 00:00:00.0, 6 pages.

"Notice of Allowance", U.S. Appl. No. 15/202,465, dated Jun. 30, 2017, 5 pages.

"Notice of Allowance", U.S. Appl. No. 15/361,338, dated Dec. 7, 2017, 9 pages.

"Pre-Interview Communication", U.S. Appl. No. 15/418,432, dated Apr. 5, 2018, 4 pages.

"Pre-Interview Office Action", U.S. Appl. No. 15/361,338, dated Sep. 26, 2017, 4 pages.

"Pre-Interview Office Action", U.S. Appl. No. 15/202,477, dated Nov. 8, 2017, 4 pages.

"Pre-Interview Office Action", U.S. Appl. No. 15/418,470, dated Dec. 14, 2017, 4 pages.

Gilliland, et al., "The Textile Interface Swatchbook: Creating Graphical User Interface-like Widgets with Conductive Embroidery", International Symposium on Wearable Computers (ISWC), Oct. 10, 2010, 8 pages.

Komor, et al., "Is It Gropable?—Assessing the Impact of Mobility on Textile Interfaces", International Symposium on Wearable Computers, Sep. 4, 2009, 5 pages.

Schoessler, et al., "Cord UIs: Controlling Devices with Augmented Cables", TEI '15 Proceedings of the Ninth International Conference on Tangible, Embedded, and Embodied Interaction, Jan. 1, 2015, 4 pages.

Schwarz, et al., "Cord Input: An Intuitive, High-Accuracy, Multi-Degree-of-Freedom Input Method for Mobile Devices", Research Gate; Conference Paper, Jan. 2010, 5 pages.

Zeagler, et al., "Textile Interfaces: Embroidered Jog-Wheel, Beaded Tilt Sensor, Twisted Pair Ribbon, and Sound Sequins", 16th International Symposium on Wearable Computers, Jun. 18, 2012, 4 pages.

"Notice of Allowance", U.S. Appl. No. 15/418,432, dated Sep. 12, 2018, 12 pages.

* cited by examiner

Fig. 6

INTERACTIVE CORD WITH RESISTANCE TOUCHPOINTS

BACKGROUND

In-line controls for cords are standard and ubiquitous for devices such as earbuds or headphones for music players, cellular phone usage, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

SUMMARY

This document describes techniques and devices for an interactive cord with resistance touchpoints. An interactive cord includes an audio wire, and a fabric cover that covers the audio wire. The fabric cover includes at least one conductive thread integrated into the fabric cover to form at least one touchpoint at which the conductive thread makes contact with the audio wire when the touchpoint is pressed. The contact of the conductive thread with the audio wire creates a resistance value that is mapped to a control. The resistance value is based on a resistance of the conductive thread and a length of the conductive thread from a base of the interactive cord to the touchpoint. The resistance value is detectable by a controller implemented at a computing device that is coupled to the interactive cord. In response to detection of the resistance value, the controller triggers the control, which may include one or more of playing audio for the headset, pausing the audio for the headset, increasing volume of the audio for the headset, decreasing the volume of the audio for the headset, powering on the headset, skipping to a next audio track for the headset, or skipping to a previous audio track for the headset, to name just a few.

This summary is provided to introduce simplified concepts concerning an interactive cord with resistance touchpoints, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for an interactive cord with resistance touchpoints are described with reference to the following drawings. The same numbers are used throughout the drawings to reference like features and components.

DETAILED DESCRIPTION

Overview

Conventional in-line controls, such as for a headset cord, include hardware buttons that short the audio wires with different resistances to indicate which button has been pressed. For example, a conventional in-line control for headset may include hardware buttons to play and pause audio to the headset, as well as to increase or decrease the volume of the audio. In response to pressing one of the hardware buttons, a resistor associated with the hardware button causes the resistance to change to a value associated with the button. A controller, implemented at a computing device that is coupled to the cord, can detect the resistance value when the button is pressed, and trigger a control that is mapped to the resistance value. Conventional computing devices, such as smailphones, include a controller that is configured to recognize a standardized mapping of resistance values to controls associated with hardware buttons. For example, for the Android® standard, four standard resistance values are recognized: 0 ohms, 135 ohms, 240 ohms, and 470 ohms.

An interactive cord with resistance touchpoints is described herein. An interactive cord includes an audio wire (e.g., a mic line and/or a speaker line), and a fabric cover that covers the audio wire. Rather than utilizing hardware buttons that generate resistance values when pressed, the fabric cover includes at least one conductive thread integrated into the fabric cover to form at least one touchpoint at which the conductive thread makes contact with the audio wire when the touchpoint is pressed. The contact of the conductive thread with the audio wire creates a resistance value that is mapped to a control. The resistance value is based on a resistance of the conductive thread and a length of the conductive thread from a base of the interactive cord to the touchpoint. The resistance value is detectable by a controller implemented at a computing device that is coupled to the interactive cord. In response to detection of the resistance value, the controller triggers the control, which may include one or more of playing audio for the headset, pausing the audio for the headset, increasing volume of the audio for the headset, decreasing the volume of the audio for the headset, powering on the headset, skipping to a next audio track for the headset, or skipping to a previous audio track for the headset, to name just a few.

In one or more implementations, the interactive cord is designed with touchpoints which generate resistance values, when pressed against the audio wire, that conform to a headset standard, such as existing headset standards (e.g., Android®), or any other existing or future headset standards. In this way, the interactive cord replaces bulky hardware controls with integrated touchpoints, while still being compatible with existing computing devices such that the computing devices do not require additional components or circuitry other than a conventional controller implemented on standard devices.

Example Environment

Figure 1:
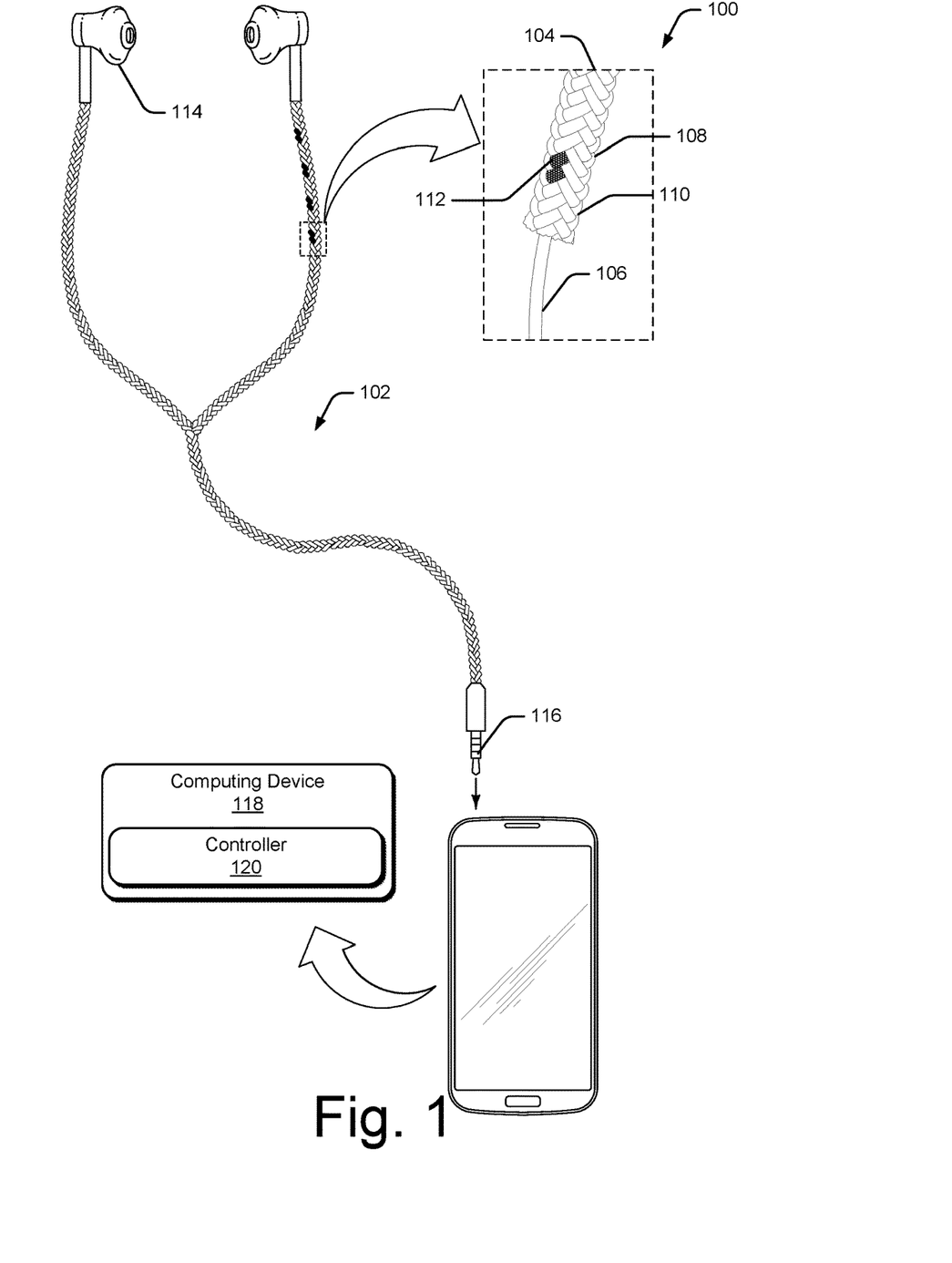
FIG. 1 is an illustration of an example environment in which techniques using, and objects including, an interactive cord with resistance touchpoints may be implemented.

FIG. 1 is an illustration of an example environment 100 in which techniques using, and objects including, an interactive cord with resistance touchpoints may be implemented. Environment 100 includes an interactive cord 102, which is illustrated as a cord for a headset. While interactive cord 102 will be described as a cord for a headset, such as earbuds or headphones, it is to be noted that interactive cord 102 may be utilized for various different types of uses, such as cords for appliances (e.g., lamps or fans), USB cords, SATA cords, data transfer cords, power cords, or any other type of cord that is used to transfer data or media.

Interactive cord 102 includes a fabric cover 104 which is configured to cover an audio wire 106 (e.g., a microphone wire and/or speaker wire) of interactive cord 102. In FIG. 1, a cutaway shows an example of fabric cover 104 and audio wire 106 beneath the cover. In this example, audio wire 106 is configured to communicate audio data to headset. Audio signals are particularly vulnerable to RF interference. Thus, cords for headsets, cable TV, and other types of audio/visual wiring often contain foil or stranded wire wrapped around the signal conductors to protect the signal from radio frequency interference and to provide an electrical ground. Headset cords and other media cords also often have a woven fabric outer layer to provide some physical protection to the electrical cords, to help avoid tangling, and to improve the feel and appearance of the wires. Thus, in one or more implementations, fabric cover 104 acts as an RF shield for audio wire 106, thereby reducing the need to manufacture interactive cord 102 with a separate RF shield. In addition, fabric cover 104 creates an attractive and protective covering for interactive cord 102 that also helps to prevent tangling.

Instead of using separate hardware controls that are installed on the cord (and which are often bulky, unsightly, and expensive), interactive cord 102 is configured to sense touch input by integrating one or more conductive threads 108 into the fabric cover 104, such as by weaving, braiding, wrapping, or twisting the conductive threads 108 into the fabric cover 104. Generally, conductive thread 108 corresponds to a thread that is flexible, but includes a conductive wire.

Figure 2:
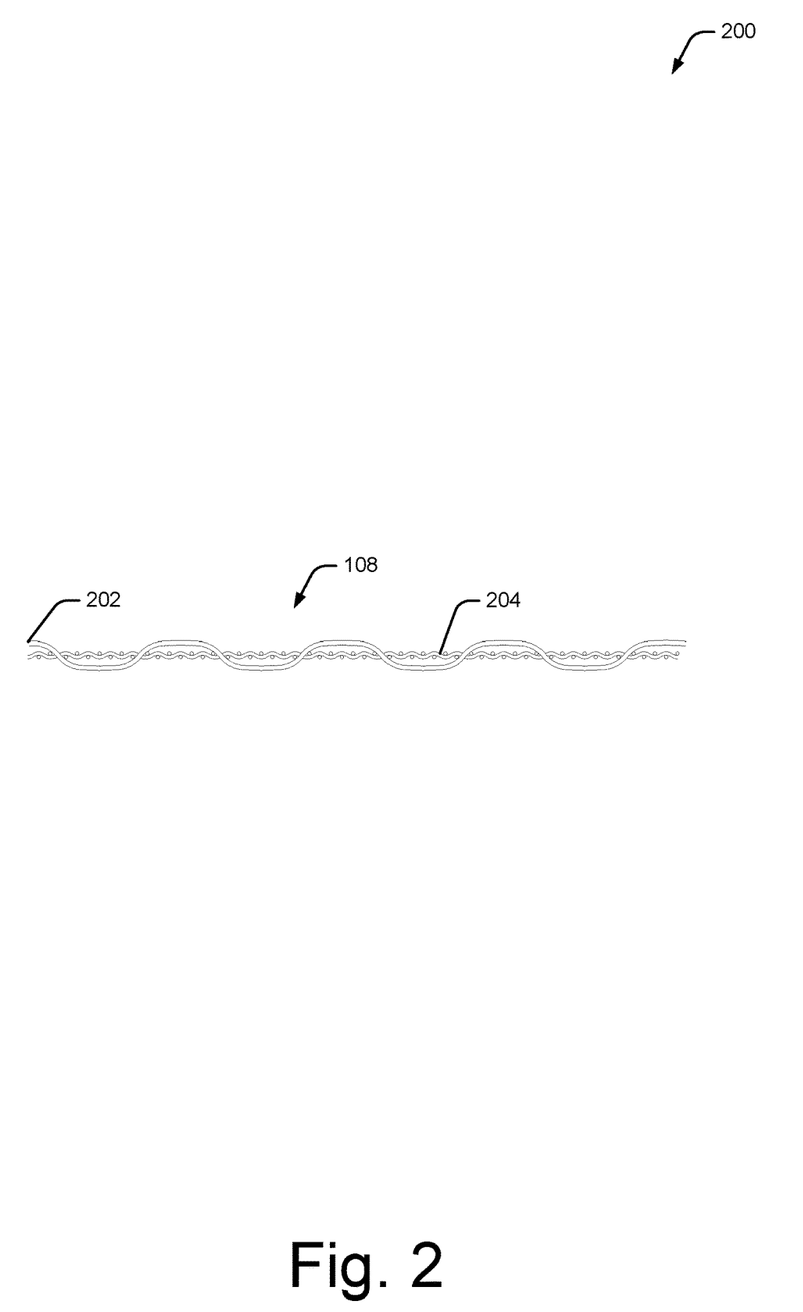
FIG. 2 illustrates an example of a conductive thread in accordance with one or more implementations.

Consider, for example, FIG. 2 which illustrates an example 200 of conductive thread 108 in accordance with one or more implementations. In this example, conductive thread 108 includes a conductive wire 202 that is combined with one or more flexible threads 204. Conductive wire 202 may be combined with flexible threads 204 in a variety of different ways, such as by twisting flexible threads 204 with conductive wire 202, wrapping flexible threads 204 with conductive wire 202, braiding or weaving flexible threads 204 to form a cover that covers conductive wire 202, and so forth. Conductive wire 202 may be implemented using a variety of different conductive materials, such as copper, silver, gold, aluminum, or other materials coated with a conductive polymer. Flexible thread 204 may be implemented as any type of flexible thread or fiber, such as cotton, wool, silk, nylon, polyester, and so forth. In some cases, conductive threads 108 may refer to a conductive wire 202 that does not include a flexible thread. Furthermore, in some cases, conductive thread 108 may be insulated with a material such as Teflon.

Combining conductive wire 202 with flexible thread 204 causes conductive thread 108 to be flexible and stretchy, which enables conductive thread 108 to be easily woven, braided, or otherwise integrated with one or more non-conductive threads 110 (e.g., cotton, silk, or polyester) to form fabric cover 104. Alternately, in at least some implementations, fabric cover 104 can be formed using only conductive threads 108.

In order to enable fabric cover 104 to sense touch input, the fabric cover is constructed with one or more resistance touchpoints 112 ("touchpoints 112"). As described herein, touchpoints 112 correspond to positions on fabric cover 104 at which conductive thread 108 makes contact with audio wire 106 when the touchpoint is pressed or squeezed by a user.

Touchpoints 112 may be formed with a visual or tactile cue to enable the user to easily recognize the location of the touchpoint 112. In FIG. 1, for instance, four different touchpoints 112 are identified using a specific color (black) that is a different color (white) than the remainder of the fabric cover 104. Thus, the different color of the touchpoint 112 provides a visual cue to the user as to where the touchpoint 112 is located. Alternately or additionally, the one or more conductive threads 108 can integrated into fabric cover 104 to create one or more tactile touchpoints 112. For example, the touchpoints 112 can be formed to protrude slightly from fabric cover 104 in a way that can be felt by the user when touching interactive cord 102.

In environment 100, interactive cord 102 includes earbuds 114 and a connector 116 that is configured to be plugged into a computing device 118. In one or more implementations, connector 116 corresponds to a standard 3.5 mm audio jack. However, other types of connectors 116 may also be utilized, such as a 2.5 mm audio jack, a 6.35 mm audio jack, or a lightning connector for iPhone®, to name just a few.

Computing device 118 is illustrated as a mobile phone, but may also be configured as a desktop computer, a laptop computer, a tablet device, a wearable device, and so forth. Thus, computing device 118 may range from full resource devices with substantial memory and processor resources (e.g., personal computers, game consoles) to low-resource devices with limited memory and/or processing resources (e.g., mobile devices).

Computing device 118 is illustrated as including a controller 120 which is representative of functionality to detect resistance values from a headset cord, and to trigger various controls or functions based on the resistance value. Such controls or functions can include, by way of example and not limitation, starting playback of audio to the headset, pausing audio, skipping to a new audio file, adjusting the volume of the audio, and so forth. In some cases, controller 120 is a standardized controller that is configured to recognize a standardized set of resistance values which are mapped to a standardized set of controls or functions. For example, the standard resistances for Android® is 0 ohms, 135 ohms, 240 ohms, and 470 ohms. Thus, manufacturers of conventional headset cords design the hardware buttons to signal these standardized resistance values when pressed.

In accordance with various implementations, interactive cord 102 is designed with touchpoints 112 which generate resistance values, when pressed against audio wire 106, that conform to headphone standards, such as existing headphone standards (e.g., Android®), or any other existing or future headphone standards. In this way, interactive cord 102 is compatible with existing computing devices 118, and does not require additional components or circuitry other than a conventional controller implemented on standard devices.

Interactive cord 102 generates the resistance values based on the resistance in the conductive thread 108 when the touchpoint 112 makes contact with the audio wire 106 when pressed. The resistance value of each touchpoint 112 corresponds to the length of the conductive thread 108 (e.g., measured from the base of the interactive cord 102 to the touchpoint) multiplied by a resistance of the wire (e.g., measured in ohms per inch). Consider, for example, a conductive thread 108 with a resistance of 10 ohms per inch. In this case, 13.5 inches of the conductive thread generates a resistance value of 135 ohms (e.g., 10 ohms/inch×13.5 inches). Thus, the resistance of the touchpoints 112 can be designed to have specific resistance values based on the inherent resistance of the material of the wire and a length of the conductive thread 108.

When a single conductive thread 108 is used to form multiple touchpoints 112, the resistance values associated with each of the touchpoints 112 is formed by varying the length of the conductive thread 108 at the position of the touchpoint 112 (e.g., from the base of the interactive cord 102 to the position of the touchpoint 112). Consider, for example, the case in which a single conductive thread 108, with a resistance of 10 ohms per inch, is utilized to create four distinct touchpoints corresponding to the standardized Android® resistance values. To do so, a touchpoint 112 with a resistance value of 0 ohms is positioned at the base of interactive cord 102 (e.g., proximate connector 116), a touchpoint 112 with a resistance value of 135 ohms is positioned 13.5 inches from the base of interactive cord 102, a touchpoint 112 with a resistance value of 240 ohms is positioned 24 inches from the base of the interactive cord 102, and a touchpoint 112 with a resistance value of 470 ohms is positioned 47 inches from the base of the interactive cord 102.

As another example, consider the case in which a single conductive thread 108, with a resistance of 20 ohms per inch, is utilized to create four distinct touchpoints corresponding to the standardized Android® resistance values. To do so, a touchpoint 112 with a resistance value of 0 ohms is positioned at the base of interactive cord 102 (e.g., proximate connector 116), a touchpoint 112 with a resistance value of 135 ohms is positioned 6.75 inches from the base of interactive cord 102, a touchpoint 112 with a resistance value of 240 ohms is positioned 12 inches from the base of the interactive cord 102, and a touchpoint with a resistance value of 470 ohms is positioned 23.5 inches from the base of the interactive cord 102.

Notably, the way in which the conductive thread 108 is woven, braided, or otherwise integrated into the fabric cover 104 may be designed to place touchpoints 112 at desired regions of the interactive cord 102. For example, by wrapping or weaving the conductive thread 108 into the fabric cover 104 in a certain way, all of the touchpoints 112 could be positioned within a 5-inch segment of the interactive cord 102, such as proximate one of the earbuds 114 as shown in FIG. 1.

In one or more implementations, the touchpoints 112 are created using two or more different conductive threads 108 that may each include a different resistance value. For example, a first touchpoint 112 can be formed using a conductive thread 108 with a resistance value of 10 ohms per inch, and a second touchpoint 112 can be formed using a conductive thread 108 with a resistance value of 20 ohms per inch.

In order for the touchpoints 112 to generate the resistance values, the interactive cord 102 is constructed such that the conductive thread 108 makes direct contact with the audio wire 106 when the touchpoint 112 is pressed or squeezed by the user. Notably, interactive cord 102 may be constructed in a variety of different ways to ensure that the conductive thread 108 makes contact with the audio wire 106 when the touchpoint 112 is pressed or squeezed.

In one or more implementations, the conductive thread 108 utilized to form the touchpoints 112 is insulated (e.g., using Teflon). However, the insulation of the conductive thread 108 is removed at the position of each touchpoint 112 to enable the conductive thread 108 to make contact with the audio wire 106 when the touchpoint 112 is pressed or squeezed by the user.

Alternately or additionally, interactive cord 102 may include an insulated sheath that is positioned between the audio wire 106 and the fabric cover 104. In this implementation, the insulation of the insulated sheath is removed at the position of each touchpoint 112 to enable the conductive thread 108 to make contact with the audio wire 106 when the touchpoint 112 is pressed.

Alternately or additionally, the conductive thread 108 may be integrated (e.g., woven or braided) with one or more non-conductive threads 110 that are insulated to form the fabric cover 104. However, at the position of each touchpoint 112, the fabric cover 104 exposes the conductive thread 108 to the audio wire 106 to enable the conductive thread 108 to make contact with the audio wire 106 when the touchpoint 112 is pressed.

Figure 3:
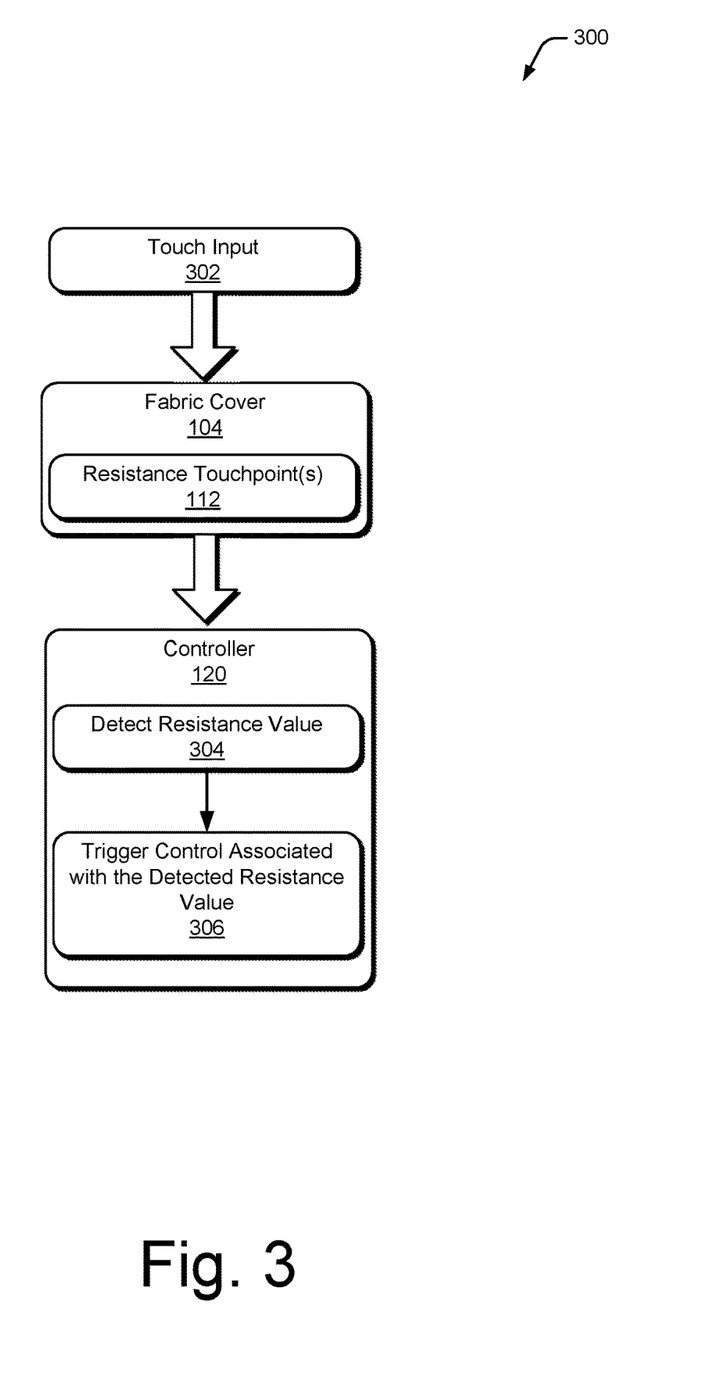
FIG. 3 illustrates an example system configured to detect resistance values of an interactive cord for a headset.

FIG. 3 illustrates an example system 300 configured to detect resistance values of an interactive cord 102 for a headset. In system 300, touch input 302 is provided to one or more touchpoints 112 of fabric cover 104.

Figure 4:
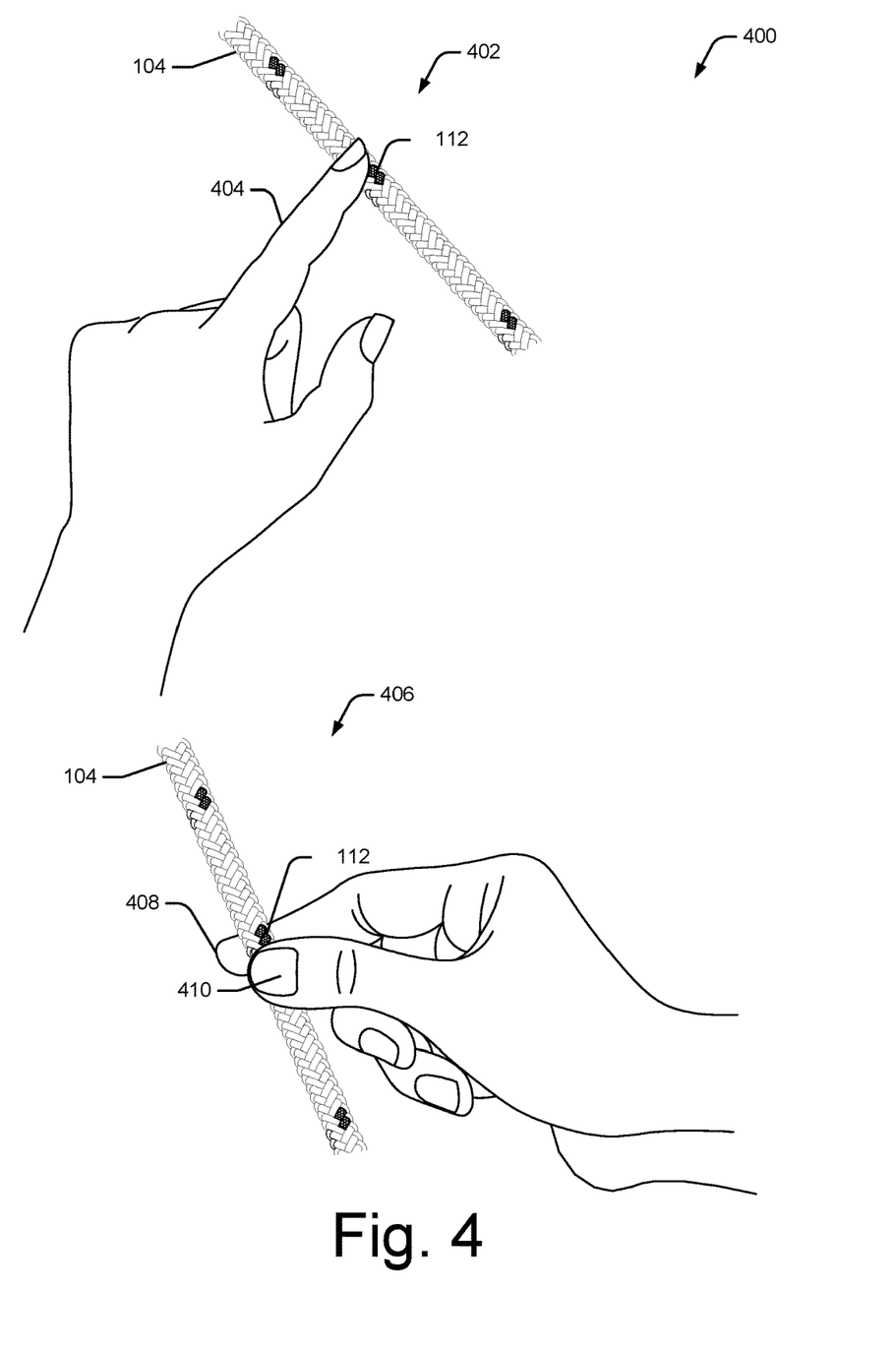
FIG. 4 illustrates examples of providing touch input to a fabric cover of an interactive cord in accordance with one or more implementations.

By way of example, consider FIG. 4, which illustrates examples 400 of providing touch input to touchpoints 112 of an interactive cord in accordance with one or more implementations. At 402, a finger 404 of a user's hand provides touch input by pressing a touchpoint 112 of fabric cover 104 of interactive cord 102. Alternately, at 406 an index finger 408 and a thumb 410 of the user's hand provides touch input by squeezing or pinching a touchpoint 112 of fabric cover 104. As discussed throughout, providing touch input, by either pressing or squeezing the touchpoint, causes conductive thread 108 to make contact with the audio wire 106, which generates a resistance value associated with the touchpoint 112.

Returning to FIG. 3, at 304 controller 120 detects a resistance value, associated with touchpoint 112, when touch input 302 is provided to the touchpoint 112. The detected resistance value is based on a resistance of the conductive thread 108 as well as the length of the conductive thread from a base of the interactive cord 102 to the touchpoint 112. Controller 120 may then compare the detected resistance value to stored resistance values that are mapped to different functions or controls. In one or more implementations, controller 120 compares the detected resistance value to a standardized mapping of resistance values (e.g., 0 ohms, 135 ohms, 240 ohms, and 470 ohms) and controls.

Based on this comparison, at 306, controller 120 triggers a control associated with the detected resistance value. Notably, controller 120 may trigger a variety of different controls, such playing audio (e.g., a song, video, audiobook file, or voice memo), pausing audio, fast forwarding audio, skipping to a next audio track, adjusting the volume of the audio, and so forth.

Example Method

Figure 5:
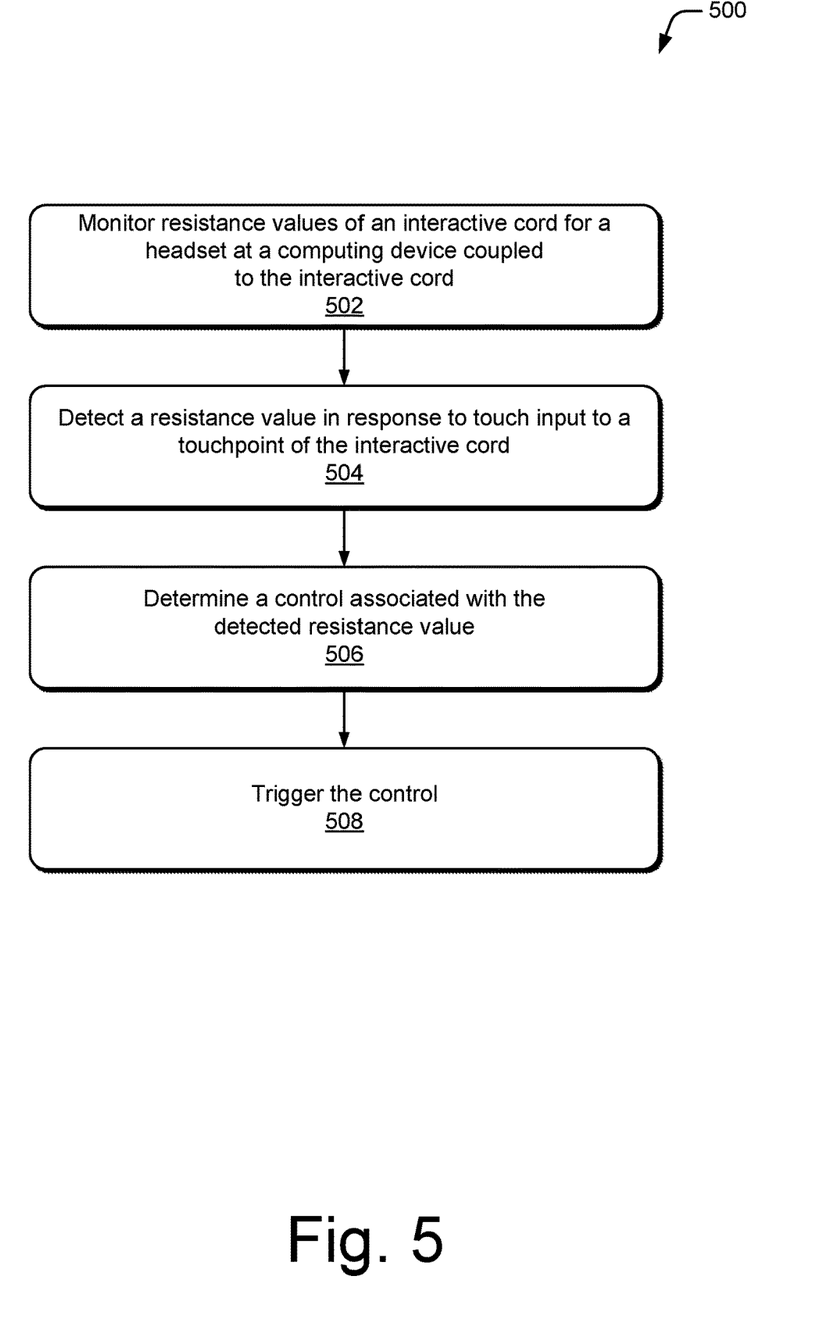
FIG. 5 illustrates an example method of detecting resistance values for an interactive cord of a headset.

FIG. 5 illustrates an example method 500 of detecting resistance values for an interactive cord 102 of a headset. This method is shown as sets of blocks that specify operations performed but are not necessarily limited to the order or combinations shown for performing the operations by the respective blocks. The techniques are not limited to performance by one entity or multiple entities operating on one device.

At 502, resistance values of an interactive cord for a headset are monitored at a computing device coupled to the interactive cord. For example, controller 120 of computing device 118 monitors resistance values of an interactive cord 102 for a headset that is coupled to the computing device (e.g., via a 3.5 mm headphone jack).

At 504, a resistance value is detected in response to touch input to a touchpoint of the interactive cord. For example, controller 120 detects a resistance value when a user provides touch input to a touchpoint 112 of the interactive cord 102 by touching or squeezing the touchpoint.

At 506, a control associated with the detected resistance value is determined. For example, controller 120 may compare the detected resistance value to stored resistance values that are mapped to different functions or controls to determine the control associated with the resistance value. In one or more implementations, controller 120 compares the detected resistance value to a standardized mapping of resistance values (e.g., 0 ohms, 135 ohms, 240 ohms, and 470 ohms) and controls.

At 508, a control associated with the detected resistance value is triggered. For example, controller 120 triggers a control associated with the resistance value detected at step 504. Notably, controller 120 may trigger a variety of different controls, such playing audio (e.g., a song, video, audiobook file, or voice memo), pausing audio, fast forwarding audio, skipping to a next audio track, adjusting the volume of the audio, and so forth.

Example Computing System

Figure 6:
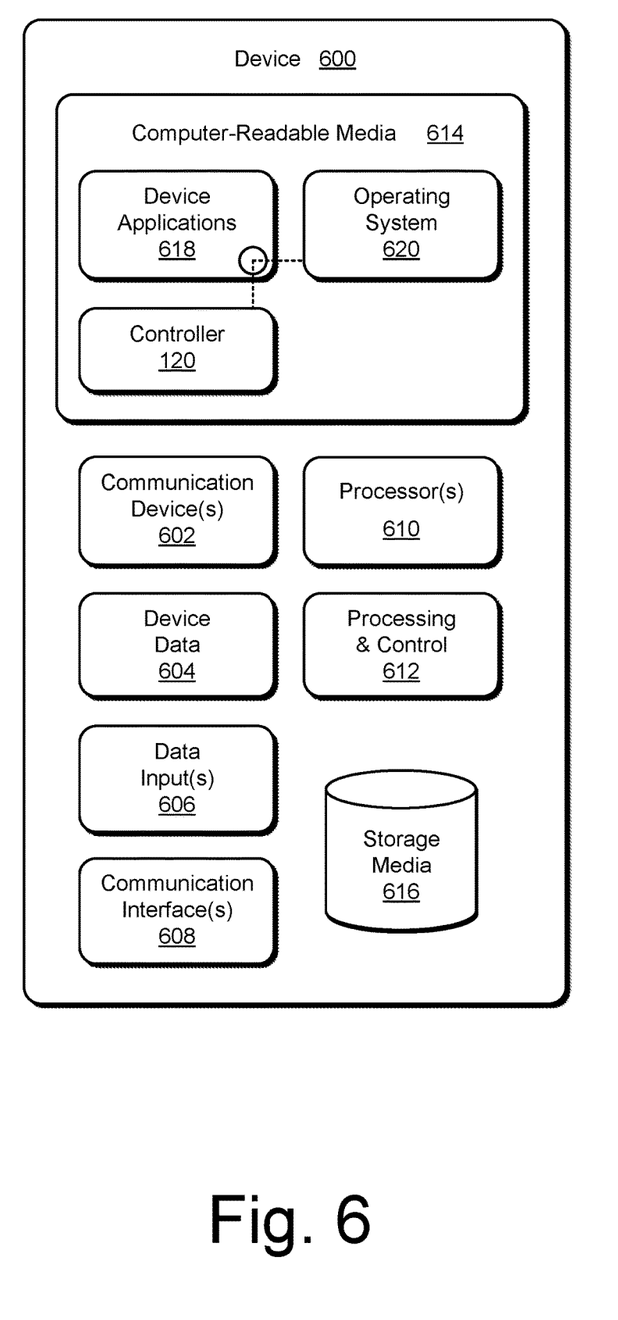
FIG. 6 illustrates various components of an example computing system that can be implemented as any type of client, server, and/or computing device as described with reference to the previous FIGS. 1-5 to implement interactive cord with resistance touchpoints.

FIG. 6 illustrates various components of an example computing system 600 that can be implemented as any type of client, server, and/or computing device as described with reference to the previous FIGS. 1-5 to implement interactive cord with resistance touchpoints. In embodiments, computing system 600 can be implemented as one or a combination of a wired and/or wireless wearable device, System-on-Chip (SoC), and/or as another type of device or portion thereof computing system 600 may also be associated with a user (e.g., a person) and/or an entity that operates the device such that a device describes logical devices that include users, software, firmware, and/or a combination of devices.

Computing system 600 includes communication devices 602 that enable wired and/or wireless communication of device data 604 (e.g., received data, data that is being received, data scheduled for broadcast, data packets of the data, etc.). Device data 604 or other device content can include configuration settings of the device, media content stored on the device, and/or information associated with a user of the device. Media content stored on computing system 600 can include any type of audio, video, and/or image data. Computing system 600 includes one or more data inputs 606 via which any type of data, media content, and/or inputs can be received, such as human utterances, touch data generated by interactive cord 102, user-selectable inputs (explicit or implicit), messages, music, television media content, recorded video content, and any other type of audio, video, and/or image data received from any content and/or data source.

Computing system 600 also includes communication interfaces 608, which can be implemented as any one or more of a serial and/or parallel interface, a wireless interface, any type of network interface, a modem, and as any other type of communication interface. Communication interfaces 608 provide a connection and/or communication links between computing system 600 and a communication network by which other electronic, computing, and communication devices communicate data with computing system 600.

Computing system 600 includes one or more processors 610 (e.g., any of microprocessors, controllers, and the like), which process various computer-executable instructions to control the operation of computing system 600 and to enable techniques for, or in which can be embodied, interactive cord. Alternatively or in addition, computing system 600 can be implemented with any one or combination of hardware, firmware, or fixed logic circuitry that is implemented in connection with processing and control circuits which are generally identified at 612. Although not shown, computing system 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 600 also includes computer-readable media 614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 600 can also include a mass storage media device 616.

Computer-readable media 614 provides data storage mechanisms to store device data 604, as well as various device applications 618 and any other types of information and/or data related to operational aspects of computing system 600. For example, an operating system 620 can be maintained as a computer application with computer-readable media 614 and executed on processors 610. Device applications 618 may include a device manager, such as any form of a control application, software application, signal-processing and control module, code that is native to a particular device, a hardware abstraction layer for a particular device, and so on.

Device applications 618 also include any system components, engines, or managers to implement interactive cord. In this example, device applications 618 include controller 120.

CONCLUSION

Although embodiments of an interactive cord with resistance touchpoints have been described in language specific to features and/or methods, it is to be understood that the subject of the appended claims is not necessarily limited to the specific features or methods described. Rather, the specific features and methods are disclosed as example implementations of an interactive cord with resistance touchpoints.

What is claimed is:

1. An interactive cord for a headset, the interactive cord comprising:
   an audio wire; and
   a fabric cover that covers the cable, the fabric cover comprising at least one conductive thread integrated into the fabric cover to form at least one touchpoint at which the conductive thread makes contact with the audio wire when the touchpoint is pressed;
   the contact of the conductive thread with the audio wire creating a resistance value that is mapped to a control, the resistance value based on a resistance of the conductive thread and a length of the conductive thread from a base of the interactive cord to the touchpoint.

2. The interactive cord of claim 1, wherein the resistance value is detectable by a controller implemented at a computing device that is coupled to the interactive cord, and wherein the controller triggers the control in response to detection of the resistance value.

3. The interactive cord of claim 1, wherein the control comprises one or more of playing audio for the headset, pausing the audio for the headset, increasing volume of the audio for the headset, decreasing the volume of the audio for the headset, powering on the headset, skipping to a next audio track for the headset, or skipping to a previous audio track for the headset.

4. The interactive cord of claim 1, wherein the fabric cover includes four touchpoints, each touchpoint associated with a different resistance value that is mapped to a different control.

5. The interactive cord of claim 1, wherein the fabric cover includes touchpoints associated with resistance values which conform to a headset standard.

6. The interactive cord of claim 1, wherein the fabric includes four touchpoints, and wherein the resistance values associated with the four touchpoints comprise 0 ohms, 135 ohms, 240 ohms, and 470 ohms.

7. The interactive cord of claim 1, wherein the at least one conductive thread forms at least two touchpoints within the fabric cover each associated with a different resistance value that is mapped to a different control, and wherein the different resistance values associated with the at least two touchpoints is formed by varying a length of the conductive thread from the base of the interactive cord to the touchpoint.

8. The interactive cord of claim 1, wherein the fabric cover includes at least two different conductive threads that each include a different resistance, and wherein each of the at least two different conductive threads form a touchpoint within the fabric cover that is associated with a different resistance value that is mapped to a different control.

9. The interactive cord of claim 1, wherein the at least one conductive thread is insulated, and wherein the insulation of the at least one conductive thread is removed at the position of the touchpoint to enable the conductive thread to make contact with the audio wire when the touchpoint is pressed.

10. The interactive cord of claim 1, wherein the interactive cord further comprises an insulated sheath positioned between the audio wire and the fabric cover, and wherein the insulation of the insulated sheath is removed at the position of the touchpoint to enable the conductive thread to make contact with the audio wire when the touchpoint is pressed.

11. The interactive cord of claim 1, wherein the at least one conductive thread is integrated with one or more non-conductive threads that are insulated to form the fabric cover, and wherein the fabric cover exposes the conductive thread to the audio wire at the position of the touchpoint to enable the conductive thread to make contact with the audio wire when the touchpoint is pressed.

12. The interactive cord of claim 1, wherein the at least one touchpoint is visually distinguishable from the remainder of the fabric cover.

13. The interactive cord of claim 1, wherein the at least one touchpoint is formed to protrude from the fabric cover.

14. The interactive cord of claim 1, wherein the interactive cord is coupled to the computing device via a 3.5 mm audio jack.

15. A computer-implemented method comprising:
monitoring, by a controller of a computing device, resistance values of an interactive cord for a headset, the interactive cord for the headset coupled to the computing device;
detecting, by the controller, a resistance value in response to touch input to a touchpoint of the interactive cord;
comparing, by the controller, the detected resistance value to a standardized mapping of resistance values and controls;
determining, by the controller and based on the comparison, a control associated with the detected resistance value; and
triggering, by the controller, the control.

16. The computer-implemented method of claim 15 wherein the control comprises one or more of playing audio for the headset, pausing the audio for the headset, increasing volume of the audio for the headset, decreasing the volume of the audio for the headset, powering on the headset, skipping to a next audio track for the headset, or skipping to a previous audio track for the headset.

17. The computer-implemented method of claim 15, wherein the controller monitors for resistance values which conform to a headset standard.

18. The computer-implemented method of claim 15, wherein the standardized mapping includes resistance values comprising 0 ohms, 135 ohms, 240 ohms, and 470 ohms.

19. The computer-implemented method of claim 15, wherein the interactive cord is coupled to the computing device via a 3.5 mm audio jack.

20. The computer-implemented method of claim 15, wherein the detected resistance value is based on a resistance of a conductive thread of the interactive cord and a length of the conductive thread from a base of the interactive cord to the touch point.

* * * * *